(12) United States Patent
Rosenberg

(10) Patent No.: US 8,947,491 B2
(45) Date of Patent: Feb. 3, 2015

(54) COMMUNICATION SYSTEM

(75) Inventor: Jonathan David Rosenberg, Freehold, NJ (US)

(73) Assignee: Microsoft Corporation, Redmond, WA (US)

(*) Notice: Subject to any disclaimer, the term of this patent is extended or adjusted under 35 U.S.C. 154(b) by 194 days.

(21) Appl. No.: 13/536,495

(22) Filed: Jun. 28, 2012

(65) Prior Publication Data

US 2014/0002578 A1    Jan. 2, 2014

(51) Int. Cl.
*H04N 7/14* (2006.01)

(52) U.S. Cl.
USPC ........................... 348/14.03; 348/14.12

(58) Field of Classification Search
USPC ............ 348/14.01, 14.03, 14.07, 14.12
See application file for complete search history.

(56) References Cited

U.S. PATENT DOCUMENTS

| | | | | |
|---|---|---|---|---|
| 7,564,476 | B1* | 7/2009 | Coughlan et al. | 348/14.08 |
| 7,612,794 | B2* | 11/2009 | He et al. | 348/14.08 |
| 7,728,866 | B2* | 6/2010 | Currivan et al. | 348/14.01 |
| 8,044,989 | B2* | 10/2011 | Mareachen | 348/14.08 |
| 8,111,280 | B2* | 2/2012 | Kim | 348/14.01 |
| 2004/0239686 | A1 | 12/2004 | Koyama et al. | |
| 2006/0259552 | A1* | 11/2006 | Mock et al. | 709/204 |
| 2008/0124041 | A1 | 5/2008 | Nielsen | |
| 2008/0158334 | A1 | 7/2008 | Reponen | |
| 2009/0086013 | A1* | 4/2009 | Thapa | 348/14.08 |
| 2009/0244256 | A1 | 10/2009 | Wheatley | |
| 2010/0134588 | A1 | 6/2010 | Kim | |
| 2010/0141784 | A1 | 6/2010 | Yoo | |
| 2011/0064388 | A1 | 3/2011 | Brown | |
| 2012/0050323 | A1* | 3/2012 | Baron et al. | 345/632 |
| 2013/0088562 | A1* | 4/2013 | Hong et al. | 348/14.07 |
| 2013/0141515 | A1* | 6/2013 | Setton | 348/14.03 |
| 2013/0250048 | A1* | 9/2013 | Aller | 348/37 |
| 2013/0342629 | A1* | 12/2013 | North et al. | 348/14.01 |

OTHER PUBLICATIONS

"International Search Report and Written Opinion", Application No. PCT/US2013/047445, Oct. 9, 2013, 9 pages.
"Introducing Android 4.0", *Android—Introducing Ice Cream Sandwich*, retrieved from <http://www.android.com/about/ice-cream-sandwich/> on Feb. 8, 2012, 6 pages.
Dean, Samuel "Free Video Chatting, with Special Effects", Retrieved from: >http://gigaom.com/collaboration/free-video-chatting-with-special-effects/<, (Feb. 8, 2008), 12 pages.

* cited by examiner

*Primary Examiner* — Olisa Anwah
(74) *Attorney, Agent, or Firm* — Sonia Cooper; Jim Ross; Micky Minhas

(57) ABSTRACT

A user terminal has an input for receiving a video signal, and a display for displaying to a user a video image derived from the video signal. A selection input is provided for receiving from the user at least one effect for enhancing the video image derived from the video signal. The user terminal has a rendering device for rendering on the display the video image derived from the video signal enhanced by the selected effect.

20 Claims, 6 Drawing Sheets

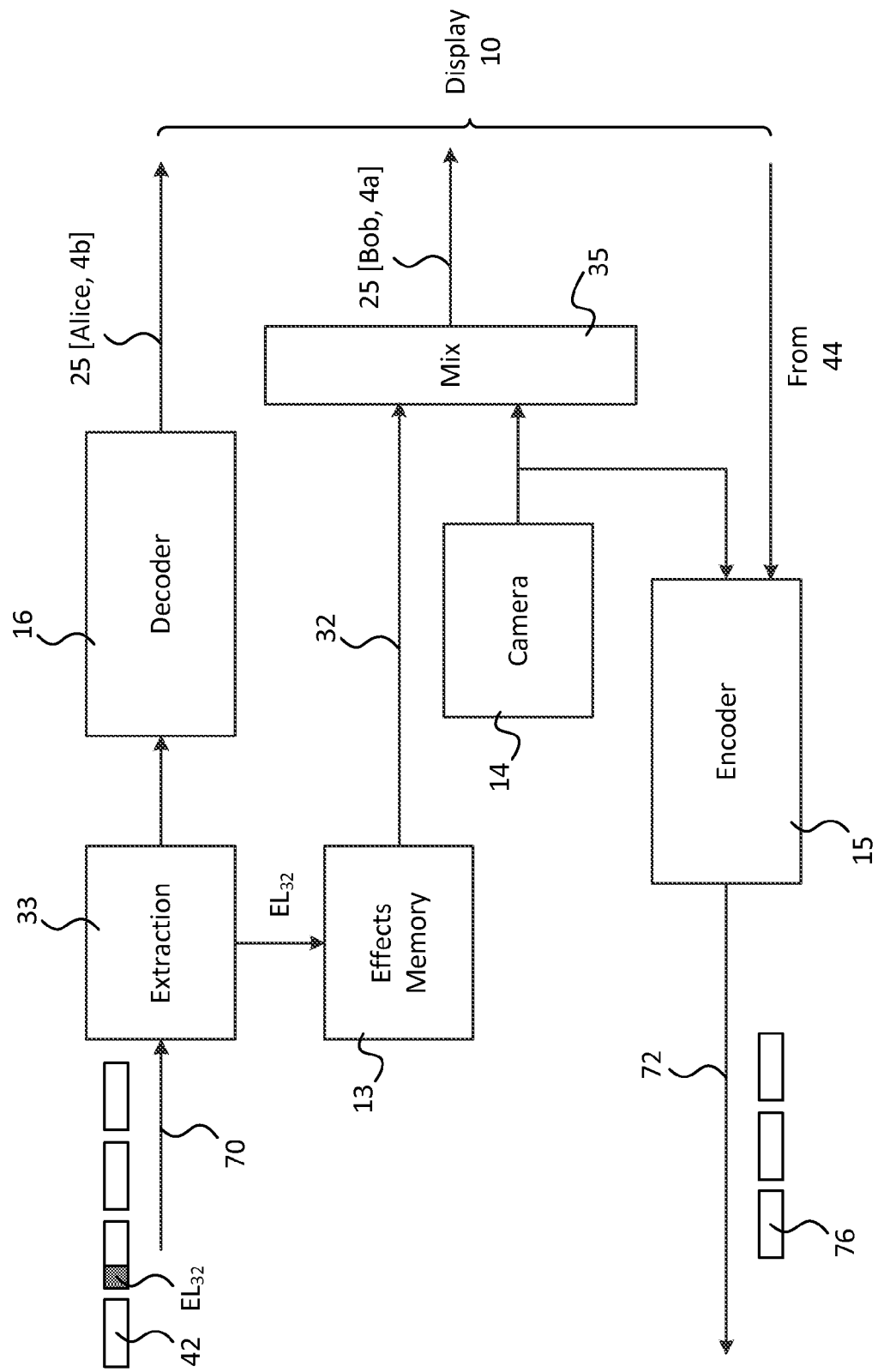

COMMUNICATION SYSTEM

BACKGROUND

Packet-based communication systems allow the user of a device, such as a personal computer, to communicate across a computer network such as the Internet. Packet-based communication systems include video over internet protocol (IP) communications systems, which allow users to exchange live video streams over the Internet. These systems are beneficial to the user as they are often of significantly lower cost than fixed line or mobile networks. This may particularly be the case for long-distance communication. To use a video-over-IP system, the user must install and execute client software on their device. The client software provides the video IP connections as well as other functions such as registration and authentication. In addition to video communication, the client may also provide further features such as audio, instant messaging ("IM"), SMS messaging, and voicemail.

Users are thus able to make face-to-face video calls, by exchanging video images taken from a web-cam mounted on each of their respective computer terminals.

Video communications can be enhanced by the use of "special effects", which enhance or alter the video image. At present this is limited to the user at the transmitting end, who can select an effect which will enhance his image rendered at the received end. One example of this is shown at the web address—http://www.logitech.com/en-us/webcam-communications/video-software-services/video-effects.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A user terminal is described in the following which has an input for receiving a video signal, and a display for displaying to a user a video image derived from the video signal. A selection input is provided for receiving from the user at least one effect for enhancing the video image derived from the video signal. The user terminal has a rendering device for rendering on the display the video image derived from the video signal enhanced by the selected effect.

A computer program product comprises program code which when executed by a processor implements a method of rendering a video image. According to the method, an indication of a selected effect is received at a user terminal. An image of a user is captured at the user terminal, and the image captured at the user terminal is rendered at a display of the user terminal, enhancing the image by the selected effect.

BRIEF DESCRIPTION OF THE DRAWINGS

For a better understanding of the described embodiments and to show how the same may be carried into effect, reference will now be made by way of example, to the accompanying drawings:

FIG. 8 is a schematic block diagram of functional blocks at a far-end terminal in accordance with one or more embodiments.

DETAILED DESCRIPTION

In the following described embodiments, users can apply video effects "photo booth" style to their video. A user can apply a video effect to the other party (remote user) in the call. For example, if Alice is calling Bob, Alice can apply the effect to Bob's video and see Bob with the effect applied. Bob can see this effect applied to himself in his self-view, and is informed of it. In one or more embodiments, Bob can be given the option to apply the effect to Alice.

In one or more embodiments, Bob or Alice can take screen shots with the effects and post to a social media environment, for example, a Facebook wall. Once posted, clicking on the post, gives the opportunity for third parties to acquire the effect.

The effect can be a static image which, for example, tracks the user's head or eyes. Animated effects are also possible.

Figure 1:
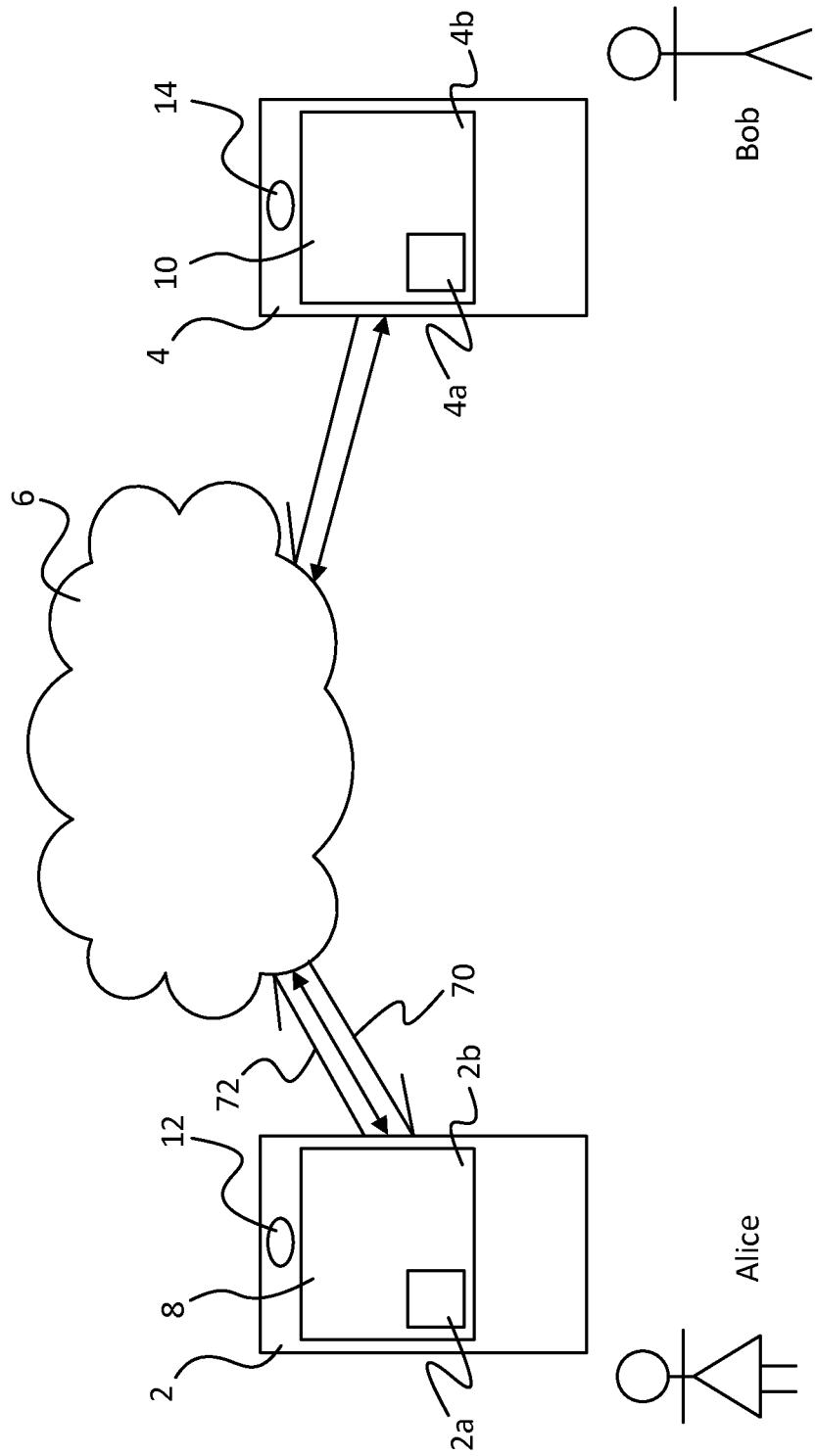
FIG. 1 is a schematic block diagram of a communication system in accordance with one or more embodiments.

FIG. 1 is a schematic block diagram of a communication system wherein a first user terminal 2 is arranged to exchange video data with a second user terminal 4 via a communication network, for example, a packet-based network such as the Internet 6. The second user terminal 4 receives video data and transmits video data in a two-way communication event (video call). Reference numeral 70 denotes received video data and reference numeral 72 denotes transmitted video data, from the perspective of one terminal.

One type of packet-based communication system uses a peer-to-peer ("P2P") topology built on proprietary protocols. To enable access to a peer-to-peer system, the user must execute P2P client software provided by a P2P software provider on their computer, and register with a P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through P2P system based on the exchange of one or more digital certificates (or user identity certificates, "UIC"), which enable access to the P2P system. The exchange of the digital certificates between users provides proof of the users' identities and that they are suitably authorized and authenticated in the P2P system. Therefore, the presentation of digital certificates provides trust in the identity of the user. It is therefore a characteristic of peer-to-peer communication that the communication is not routed using a server but directly from end-user to end-user.

Other forms of communication network are possible, such as IMS (Internet Multimedia Subsystem), and other server based systems.

Each user terminal 2, 4, comprises a display 8, 10, respectively and a camera 12, 14 for capturing moving images which can be displayed on the near-end display 8 as a video and/or transmitted to the terminal 4 for display on the remote display 10. Each display shows a self-image 2a, 4a, of the near-end user and an image 2b, 4b, of the far-end user (shown more clearly in FIGS. 3 to 7). In this case, we assume that Alice is at the first user terminal (near-end) and Bob is at the second user terminal (far-end). It will be appreciated that FIG. 1 is highly schematic and is not intended to represent accurately any particular device. User terminals of the general type can include a mobile handset terminal such as a mobile phone, a laptop computer, a tablet, a desktop computer, a television set or television with set-top box and many other types of devices. In one embodiment, e.g. smartphone or tablet, the displays 8, 10, constitute a user interface using touch screen technology, although it will be appreciated that other user interfaces can be utilized, for example, a keyboard, mouse, etc.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g., software) that causes hardware of the user terminals to perform operations, e.g., processors, functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g., as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Various embodiments permit the addition of "photobook" style video effects to the received video data, for example, at user terminal 2, under control of the receiving user (Alice) at user terminal 2. An indication of the effects can be transmitted with video data transmitted from the user terminal 2 to the user terminal 4 via the communication network 6, so that the transmitting user (Bob) can view his self-image 4a with the special effects. In particular, embodiments allow the near-end user to determine which special effect to apply to video data received from the far-end. She selects an effect from a set of effects displayed to him on display 8 using the user interface, for example by clicking (with a mouse/cursor interface) or touching the effect (with touch screen technology).

Figure 2:
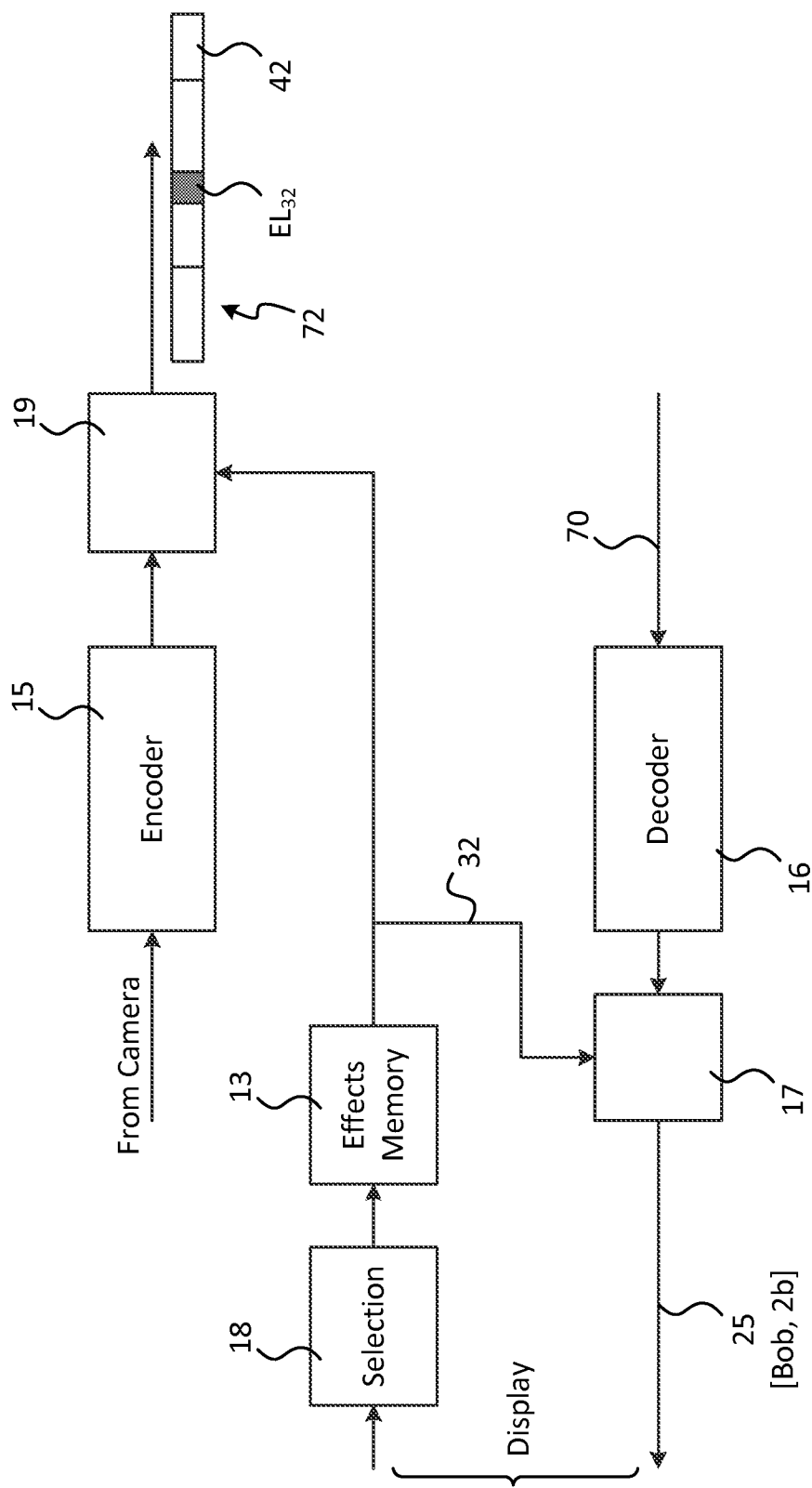
FIG. 2 is a schematic block diagram of functional blocks at a near-end user terminal in accordance with one or more embodiments.

FIG. 2 is a schematic block diagram of functional blocks at the user terminal 2. It is assumed that the video received from the terminal 4 is being displayed to a user on display 8 as image 2b. Reference numeral 18 denotes selection means with which the user can select a special effect on the display 8. The selection means 18 is connected to an effects memory 13 which supplies a selected effect 32 to a post processing block 17 connected to the output of a decoder 16 which receives the video signal 70 in the form of a packet stream. The decoder 16 receives the packets of video data 70 and decodes them. The post processing block 17 adds the selected special effect 32 and generates display control signals 25 for rendering Bob's enhanced video image 2b on the display 8. In one embodiment, information concerning the selected effect is also supplied to a post processing block 19 of an encoder 15. The encoder 14 encodes image data from the camera 12 into packets of the video signal 72 for transmission to the terminal 4. The post processing block inserts information EI32 identifying the special effect 32 so that it can be rendered at the far-end display on the self-image 4a. A notification 42 can also be included.

An alternative method is to send back a separate control message stream to the other side advising what effect is to be applied. In this way, the system can work with one way video where there is no encoder for the user.

FIG. 8 is a schematic block diagram of functional blocks at the user terminal 4. It is assumed that the user terminal 4 receives a video signal in the form of a packet stream which now includes the effect information EI32 and the notification 42. An extraction function 33 extracts the effect information EI32 and uses it to access an effects memory 13. The rest of the video signal is supplied to the decoder 16 which decodes it as normal to generate display control signals for generating the image 4b of Alice. Where the effects information is applied in a separate control message, there is no need to extract it from the video stream. Indeed it could be applied without sending a video stream. The effect 32 from the effects memory 13 is supplied to a mix function 35 which receives data from the local camera 14. In this way, the effect 32 is mixed with the local image data from camera 14 to provide display control signals 25 for rendering the enhanced self-image 4a of Bob. The camera 14 also supplies image data to the encoder 15 which generates a packet stream for supply to the remote terminal. As described more fully in the following, if Bob decides that he wishes to have the selected effect applied to Alice, he can actuate an icon 44 on the display 10 which then causes an apply effect indicator 76 to be incorporated into the video signal 72 to be transmitted back to Alice's terminal. This causes the selected effects to be applied to Alice's image at terminal 4 in the same way as it was applied to Bob's image at terminal 2. In addition, the apply effect indicator 76 is extracted by an extraction function 33 at terminal 2 to cause the effect to be mixed with the local camera in a mix function similar to 35 so as to generate enhanced self-image of Alice. The functional blocks for this are not shown in FIG. 8, only in FIG. 2.

It will readily be appreciated that although FIGS. 2 and 8 have been shown as separate Figures for ease of explanation as to what is happening at the near-end and far-end terminals, in practice, each user terminal would incorporate both near-end and far-end functionality. Although the effects memory 13 is shown as a local memory to the terminal, it will readily be appreciated that the special effects can be accessed either locally or remotely from a remote server, perhaps in the communication system 6.

Figure 4:
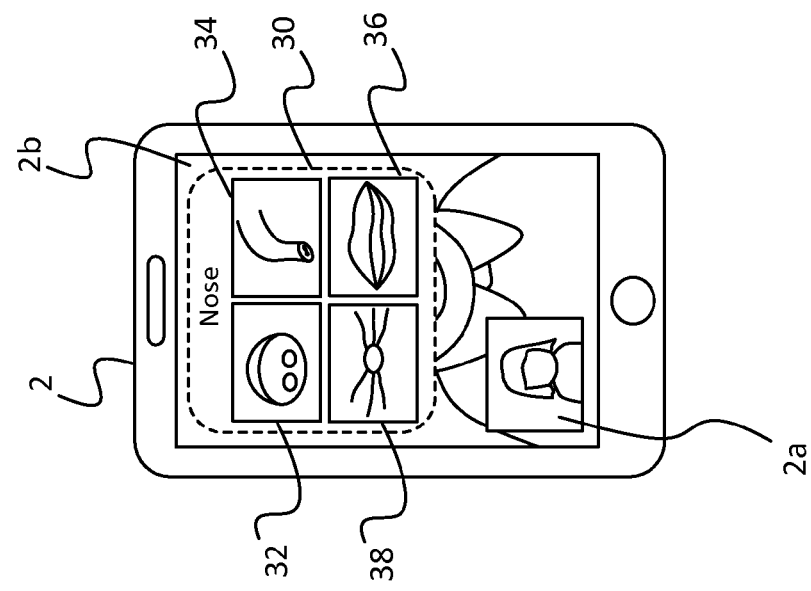
Figure 3:
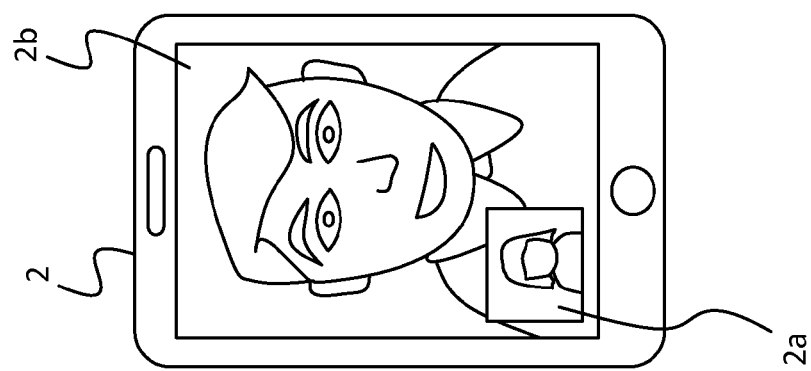
Figure 7:
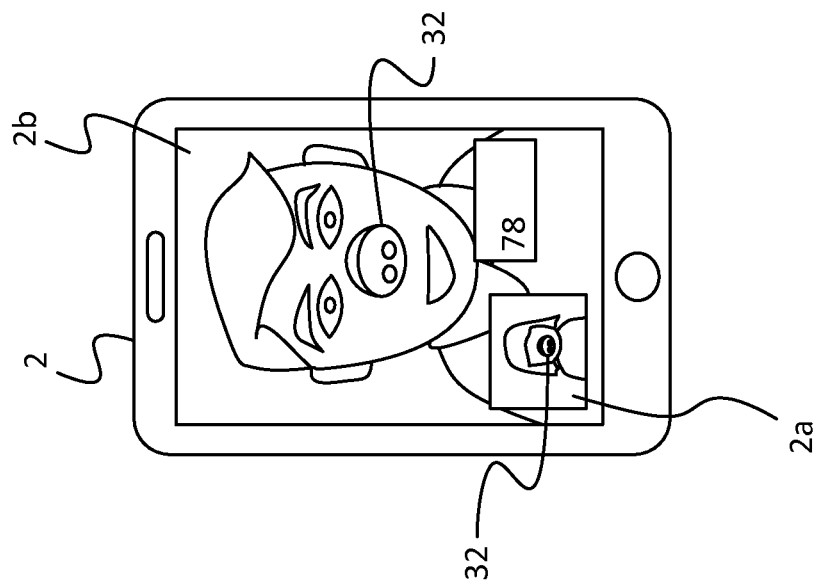

Reference will now be made to FIGS. 3-7 to describe the application of selected effects in more detail. FIG. 3 is a schematic diagram of the first user terminal 2. Reference numeral 2b denotes the video image which has been captured of the second user at the remote terminal 4 and supplied by a video signal to the first terminal 2. For ease of reference, we will refer to this as "Bob's image", Bob being the second user at the remote terminal 4. Reference numeral 2a denotes the self-image of the first user at the first terminal, who we will refer to as "Alice". This is the image captured by the camera at the first terminal 2. Alice decides to apply a video effect to Bob's image 2b. In order to do so, she selects a function 18 which displays a plurality of video effects. In FIG. 4, by way of example, a set of fake noses 30 is illustrated. These noses can be, for example, from different animals, such a pig nose 32, elephant nose 34, cat nose 36 and duckbill 38. These effects are stored in the effects memory 13. When the effects function is selected by the user, the images of the effects are recalled from the memory (whether local or remote) and displayed on the display of the terminal 2, as illustrated in FIG. 4.

Figure 5:
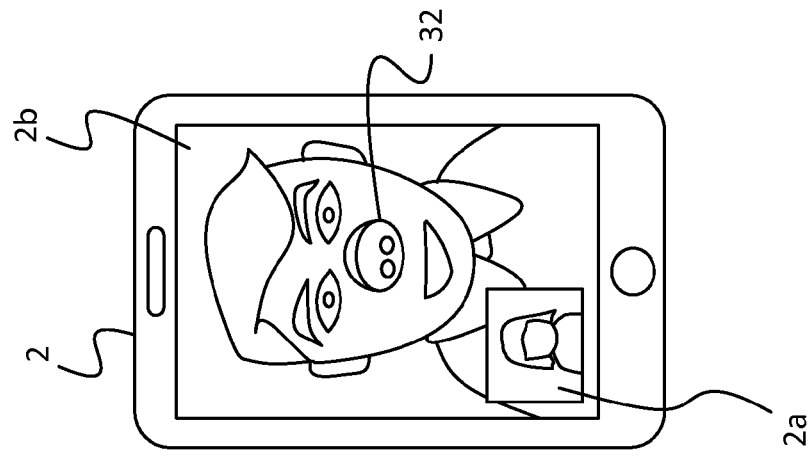
FIGS. 3 to 7 illustrate screen shots of selected effects in accordance with one or more embodiments.
Figure 6:
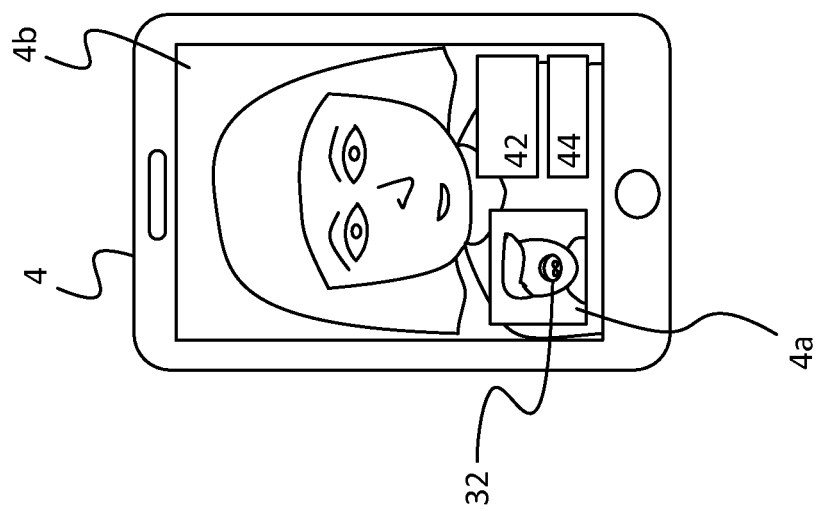

As shown in FIG. 5, in this case, Alice decides to select pig nose 32. This can be done by tapping on the nose on a touch screen, by a mouse and cursor or any other way. Once the pig nose 32 has been selected, the image of Bob is rendered as explained above with reference to FIG. 2, so as to include the nose 32. As further described above with reference to FIG. 2, information EI32 about the selected effect is transmitted to Bob's terminal 4, which is illustrated in FIG. 6. At Bob's terminal, the main displayed image 4b is of Alice. When Alice selected the effect 32, information about the effect was transmitted to Bob's terminal 4 and two notifications 42, 44, are displayed to Bob. The first notification identifies the effect which has been selected, for example, "Alice has pig-nosed you", and the second notification is in the form of an actuatable button or icon which allows Bob to apply the selected effects to Alice, for example, "pig-nose back". These notifications are rendered on the display in the form of humanly readable text based on the information which was transmitted to Bob's terminal 4 in the video signal received by it. In addition, Bob can see how he appears at Alice's terminal because his own self-image 4a is rendered with the selected effect, based on the information received at Bob's terminal 4. If Bob decides to apply the same effect to Alice, he selects the notification button 44 and the result of this is to apply the selected effect to the image of Alice which he sees 4b. This is not shown in the Figures, but it will be readily apparent from FIG. 5 which shows the effect at Alice's terminal as to how this would be perceived at Bob's terminal, with the pig nose applied to the image of Alice. In addition, apply effect indicator 76 is returned to Alice's terminal with the video signal so that her self-image 2a is likewise rendered with the selected effect 32. In addition, a notification 78 is displayed in humanly readable text, for example, "Bob has pig-nosed you back!".

Feature recognition may be used to apply the selected effect in the correct position on the video. For example, feature recognition software may detect where the user's nose is located within the image and allow the nose image to be overlaid in that region. Alternatively, the effect may be positioned on the display relative to the user's detected face position in the location selected by the user.

It will be appreciated that each user terminal comprises a processor for executing suitable software for implementing the above-mentioned functions. The functions can be implemented in any combination of hardware, firmware or software as appropriate. Although not illustrated, it is clear that each terminal executes as its processor a communication client application which establishes the two-way video call. The functions described above can form part of this communication client application or can be provided in separate software applications executed by the processor.

Figure 9:
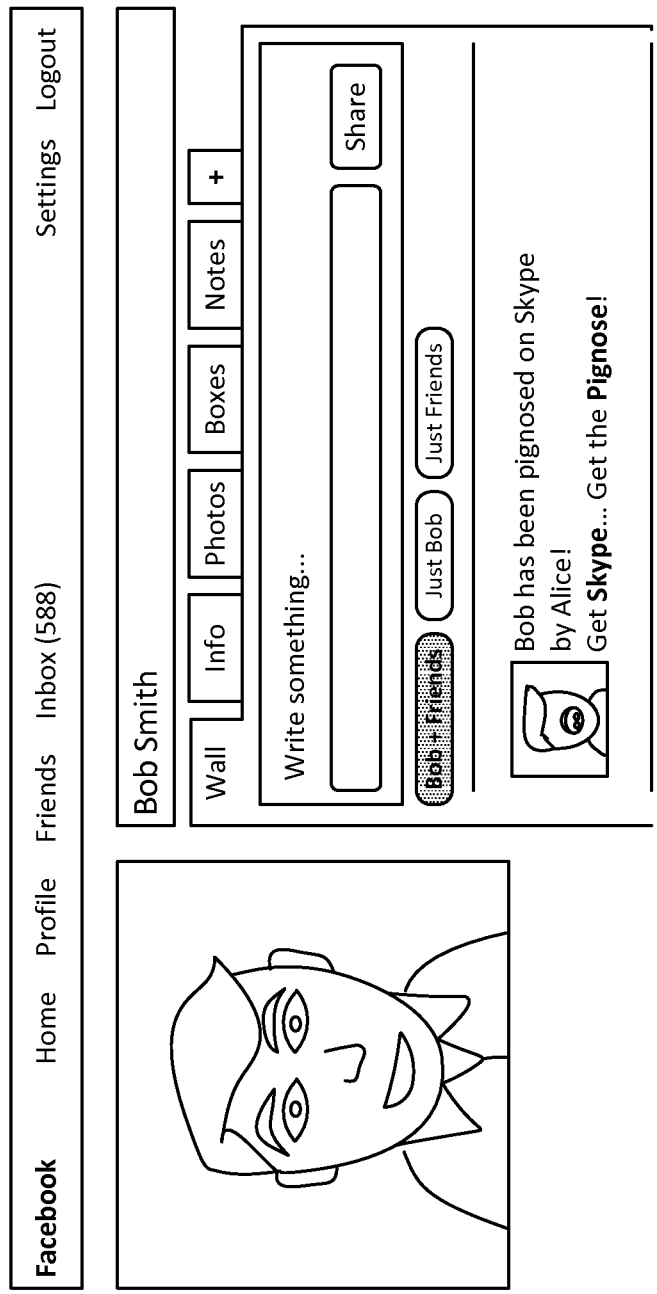
FIG. 9 is a screen shot of a social media posting in accordance with one or more embodiments.

Various embodiments allow for the additional possibility to post the selected effect as applied to the image to a social media environment, for example, to a Facebook wall belonging to the user to whom the effect has been applied (in this case Bob). In order to do so, Alice can select a share function at her terminal which calls up a number of share possibilities identifying for example, Bob's Facebook wall, Alice's Facebook wall and an email option. Alice can select an appropriate option, for example, posting to Bob's Facebook wall, and a posting of Bob's image with the selected effect applied if made to his Facebook wall, as illustrated for example, in FIG. 9. A third party can select the post by clicking on it or by any other way, and in doing so can access the effect for their own use.

The social nature of the video effect makes for a different interaction with social networks. Effects can be made available to users electronically to a user's terminal, for example by clicking on a video app icon for the effect. When launched, the video app would prompt the user to obtain the desired effect, for example by using a URL (Uniform Resource Locator) to access a web based storage location, such as a server.

According to one embodiment, there is provided a method of rendering a video image comprising:
  receiving at a first terminal a video signal transmitted from a second terminal;
  receiving from a user at the first terminal selection of at least one effect for enhancing a video image, derived from the received video signal; and
  rendering on a display at the first terminal a video image derived from the video signal enhanced by the selected effect. Another embodiment provides a user terminal comprising:
  means for receiving a video signal transmitted from a remote terminal;
  a display for displaying to a user at the user terminal a video image derived from the video signal;
  selection means for receiving from the user at the user terminal at least one effect for enhancing the video image derived from the video signal; and
  means for rendering on the display the video image derived from the video signal enhanced by the selected effect.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A user terminal comprising:
  an input for receiving a video signal;
  a display for displaying to a user at the user terminal a video image derived from the video signal;
  a selection input for receiving from the user at the user terminal at least one effect for enhancing the video image derived from the video signal; and
  a rendering device for rendering on the display the video image derived from the video signal enhanced by modifying the video signal according to the selected effect,
  the user terminal being configured to receive an indication to apply the same selected effect to a sub-portion of an image displayed on the display,
  the rendering device being configured to render the same selected effect to the sub-portion of the image displayed on the display.

2. A user terminal according to claim 1, wherein the rendering device comprises:
  a decoder arranged to decode the received video signal; and
  a post processing module arranged to perform the modifying the video signal by adding the selected effect to the decoded video signal and to generate display control signals for rendering the enhanced video image on the display, said display control signals incorporating the selected effect.

3. A user terminal according to claim 1, comprising a transmitter for transmitting an indication of the selected effect from the user terminal to a remote terminal.

4. A user terminal according to claim 3, comprising an encoder operable to encode a video image to be transmitted from the user terminal to the remote terminal, said encoder operable to insert the indication into a video signal to be transmitted from the user terminal.

5. A user terminal according to claim 1, comprising a camera for capturing an image of a user at the user terminal, the display operable to render the captured image.

6. A user terminal according to claim 1, wherein the video signal received at the user terminal indicates an effect selected by a user at a remote terminal, the user terminal comprising a mix function configured to display the image captured by the camera enhanced with the effect selected at the remote terminal.

7. A user terminal according to claim 1, comprising a processor and a memory storing a communication client for execution by the processor, wherein the communication client, when executed, establishes a communication event over which the video signal can be received at the user terminal.

8. A user terminal according to claim 7, wherein the communication event is a two-way communication event wherein video signals are exchanged between the user terminal and a remote terminal.

9. A user terminal according to claim 1, wherein the selection input for receiving said at least one effect from a user comprises at least one of:
    a touch screen;
    a keyboard;
    a mouse; or
    software code for marking the image.

10. One or more computer-readable storage media having instructions stored thereon that, responsive to execution by a computing device, cause the computing device to perform operations comprising:
    receiving a video signal at a first terminal;
    receiving from a user at the first terminal a selection of at least one effect for enhancing a video image, derived from the received video signal;
    rendering on a display at the first terminal a video image derived from the video signal enhanced by adding the selected effect to the video signal;
    receiving an apply effect indicator indicating that the same selected effect is to be applied to a sub-portion of an image displayed on the display; and
    rendering the same selected effect to the sub-portion of the image displayed on the display.

11. The one or more computer-readable storage media as recited in claim 10, wherein the operations further comprise transmitting an indication of the selected effect from the first terminal.

12. The one or more computer-readable storage media as recited in claim 10, wherein the operations further comprise detecting a feature in the video image and locating the selected effect relative to the detected feature.

13. The one or more computer-readable storage media as recited in claim 11, wherein the operations further comprise transmitting from the first terminal with the indication of the selected effect a notification that the effect has been applied.

14. The one or more computer-readable storage media as recited in claim 10, wherein the operations further comprise receiving a return notification at the first terminal, the return notification comprising a notification that the selected effect has been applied at a second terminal, and displaying the return notification at the first terminal.

15. A method of rendering a video image comprising:
    receiving, from a remote terminal, an indication of a selected effect at a user terminal;
    capturing an image of a user at the user terminal;
    rendering the image captured at the user terminal at a display of the user terminal, wherein said rendering includes enhancing the image by modifying the image according to the selected effect;
    displaying a notification that enables the user of the user terminal to cause the same selected effect to be applied at the remote terminal.

16. A method according to claim 15, comprising capturing at the user terminal an image of a user and transmitting that image in the video signal to a remote terminal, whereby the video image of the user at the user terminal is rendered on the display at the remote terminal enhanced by the selected effect.

17. A method according to claim 15, comprising causing display, on a social network site, a captured image of the user at the user terminal enhanced by the selected effect.

18. A user terminal according to claim 1, comprising a function for causing display on a social network site a captured image of the user at the user terminal enhanced by the selected effect.

19. A method according to claim 15, wherein the captured image is a still image.

20. The one or more computer-readable storage media as recited in claim 10, wherein the operations further comprise causing display on a social network site a captured image of the user at the user terminal enhanced by the selected effect.

* * * * *